United States Patent
Suanno

(10) Patent No.: US 11,745,810 B2
(45) Date of Patent: Sep. 5, 2023

(54) CANTILEVERED TRACK ROLLER IN GROUND-ENGAGING TRACK SYSTEM AND ROLLER SHELL FOR SAME

(71) Applicant: Caterpillar Inc., Peoria, IL (US)

(72) Inventor: Gennaro Suanno, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 684 days.

(21) Appl. No.: 16/825,000

(22) Filed: Mar. 20, 2020

(65) Prior Publication Data

US 2021/0291918 A1 Sep. 23, 2021

(51) Int. Cl.
*B62D 55/15* (2006.01)
*B62D 55/20* (2006.01)
*B62D 55/21* (2006.01)
*B62D 55/26* (2006.01)
*B62D 55/088* (2006.01)

(52) U.S. Cl.
CPC ........... *B62D 55/15* (2013.01); *B62D 55/202* (2013.01); *B60Y 2200/25* (2013.01); *B62D 55/088* (2013.01); *B62D 55/21* (2013.01); *B62D 55/26* (2013.01)

(58) Field of Classification Search
CPC ...... B62D 55/08; B62D 55/088; B62D 55/14; B62D 55/145; B62D 55/15; B62D 55/20; B62D 55/202; B62D 55/205; B62D 55/21; B62D 55/26
See application file for complete search history.

(56) References Cited

U.S. PATENT DOCUMENTS

| | | | |
|---|---|---|---|
| 3,945,693 A | 3/1976 | Booth, Jr. et al. | |
| 4,141,598 A * | 2/1979 | Cline | B62D 55/15 384/418 |
| 4,647,225 A | 3/1987 | Grass | |
| 6,364,438 B1 | 4/2002 | Hasselbusch et al. | |
| 7,128,176 B1 * | 10/2006 | Mills | B62M 27/02 305/167 |
| 8,801,115 B2 | 8/2014 | Hansen | |
| 9,333,999 B2 * | 5/2016 | Weeks | B62D 55/20 |
| 9,988,109 B2 * | 6/2018 | Ellmann | B62D 55/14 |
| 2013/0092459 A1 * | 4/2013 | Wodrich | B62D 55/32 180/9.1 |
| 2017/0166271 A1 | 6/2017 | Hakes et al. | |
| 2017/0274946 A1 * | 9/2017 | Vik | B62D 55/15 |
| 2019/0031256 A1 * | 1/2019 | Sewell | B62D 55/084 |
| 2021/0046981 A1 * | 2/2021 | Donlan | B62D 55/15 |
| 2021/0291918 A1 * | 9/2021 | Suanno | B62D 55/15 |
| 2022/0135155 A1 * | 5/2022 | Suanno | B62D 55/30 180/9.1 |

FOREIGN PATENT DOCUMENTS

EP 0378738 A1 7/1990

* cited by examiner

*Primary Examiner* — Minnah L Seoh
*Assistant Examiner* — Maurice L Williams

(57) ABSTRACT

A ground-engaging track system includes a track roller having a roller shell with an outer tread surface, and a roller shaft supporting the roller shell for rotation and cantilevering the track roller to a track roller frame. The track roller is positionable in the track system to contact only one of a first track rail or a second rail in a ground-engaging track.

19 Claims, 4 Drawing Sheets

CANTILEVERED TRACK ROLLER IN GROUND-ENGAGING TRACK SYSTEM AND ROLLER SHELL FOR SAME

TECHNICAL FIELD

The present disclosure relates generally to ground-engaging track systems, and more particularly to a cantilevered track roller in contact with only one track rail in a ground-engaging track and positioned to support a track roller frame upon the ground-engaging track.

BACKGROUND

Ground-engaging track systems in off-highway equipment are used throughout the world in various applications ranging from construction, road building, and forestry to large scale mining, at landfills, dam building, and many others. In a typical example, an endless loop of track links, arranged in parallel track chains attached to track shoes, extends about a plurality of rotating elements including one or more idlers, track rollers, carrier rollers, and a drive sprocket.

Ground-engaging track systems can be subjected to extremely harsh conditions, operating upon hard substrate materials, steep grades, and carrying machine weights of many tons. For this reason, track system components are typically designed to be quite robust. It is also typically necessary for at least some elements in track systems to be sealed and lubricated, and periodically serviced or replaced. In some instances, the demanding field service conditions can require premature servicing of the various rotating elements, including the track rollers which carry the weight of the machine as well as carried or pushed material, and react loads between a track roller frame and the ground-engaging track itself. One example of a ground-engaging track system employing track rollers, carrier rollers, and other known track components is taught in U.S. Pat. No. 6,364,438 to Hasselbusch et al.

SUMMARY OF THE INVENTION

In one aspect, a ground-engaging track includes a first track chain and a second track chain each having track links coupled together in an end-to-end arrangement to form, respectively, a first track rail and a second track rail, and track shoes coupling together the first track chain and the second track chain. The track system further includes a plurality of track rollers each having a roller shell having an outer tread surface extending circumferentially around a track roller axis, a shaft bore, and a roller shaft within the shaft bore. The track system further includes a track roller frame. Each of the roller shafts includes a mounting end coupled to the track roller frame, and a journaling end supporting the respective roller shell for rotation. Each of the track rollers is cantilevered by the respective roller shaft to the track roller frame and positioned, in contact with only one of the first track rail or the second track rail, to support the track roller frame upon the ground-engaging track.

In another aspect, a track roller for a ground-engaging track system includes a roller shell having an outer tread surface extending circumferentially around a roller axis, and axially between a roller shell first axial end face and a roller shell second axial end face, and having a tread surface axial length equal to at least a majority of a full axial length of the roller shell. The roller shell further includes a guide flange located adjacent to the outer tread surface, a shaft bore extending between an open bore end and a blind bore end, and a bearing surface located in the shaft bore adjacent to the blind bore end and extending circumferentially around the roller axis. A roller shaft supports the roller shell for rotation and includes a journaling end having a shaft head positioned within the shaft bore in contact with the bearing surface, and a mounting end projecting from the open bore end for cantilevering the track roller to a track roller frame. The track roller further includes a rotation joint assembly connecting the roller shell to the roller shaft and including a first surface, fixed relative to the roller shaft and facing a direction of the mounting end, and a second surface, fixed to rotate with the roller shell and oriented in opposition to the first surface, such that the roller shaft is trapped within the shaft bore.

In still another aspect, a roller shell for a track roller in a ground-engaging track system includes a roller shell body having an outer tread surface extending circumferentially around a roller axis, and axially between a roller shell first axial end face and a roller shell second axial end face. The roller shell further includes a guide flange interposed the roller shell first axial end face and the outer tread surface, and extending circumferentially around the roller axis. The first axial end face has a recess formed therein, and located radially inward of the guide flange, and a shaft bore formed in the roller shell body and extending between an open bore end located in the recess, and a blind bore end. The roller shell further includes a bearing surface located in the shaft bore adjacent to the blind bore end, and extending circumferentially around the roller axis to contact a journaling end of a roller shaft within the shaft bore. The roller shell defines an axial length dimension, parallel to the roller axis, and the outer tread surface defines a radial diameter dimension, normal to the roller axis, and the radial diameter dimension is larger than the axial length dimension.

DETAILED DESCRIPTION

Figure 1:
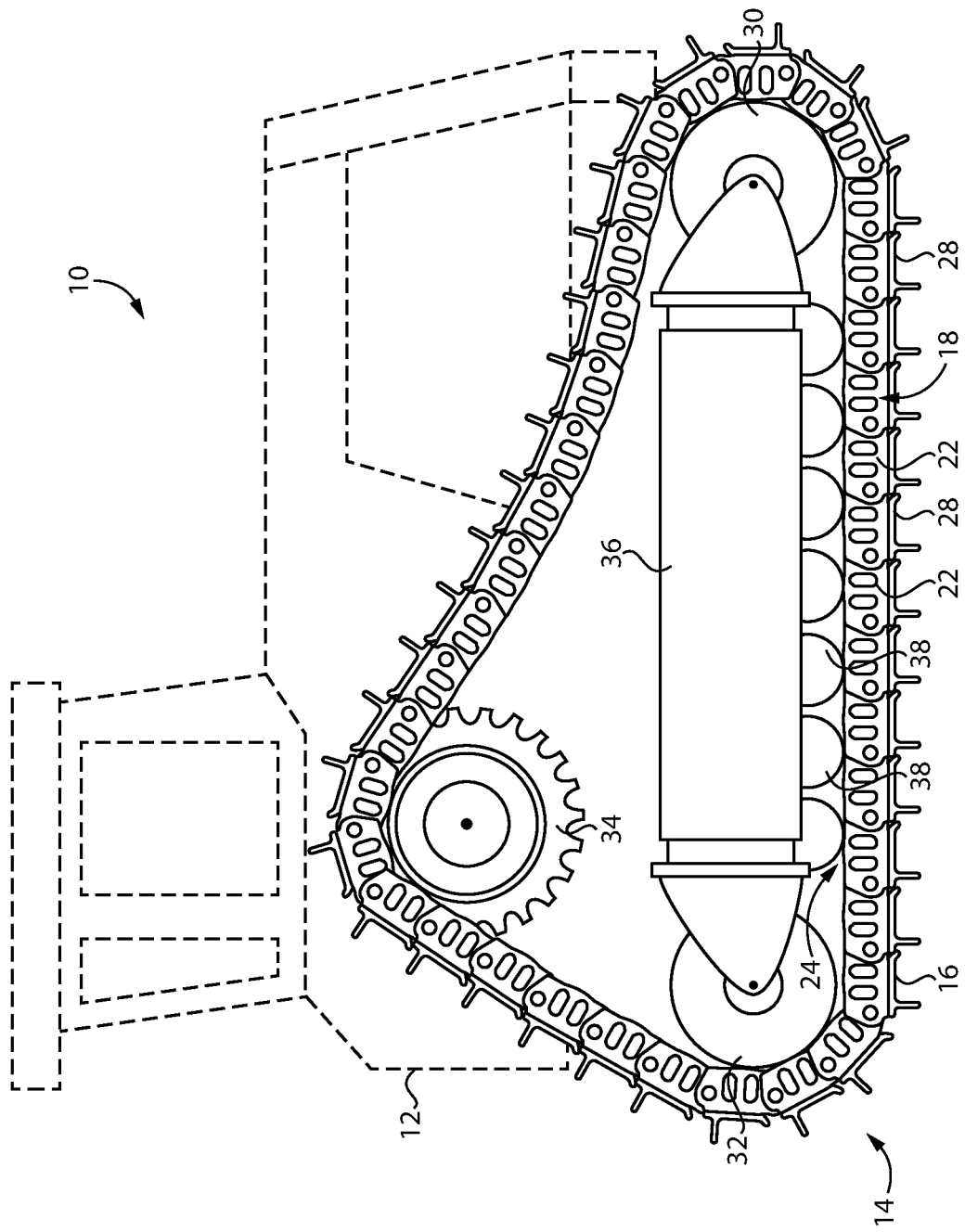
FIG. 1 is a side diagrammatic view of a machine, according to one embodiment.

Referring to FIG. 1, there is shown a machine 10 including a frame 12 and a ground-engaging track system 14 supporting frame 12. Machine 10 is shown in the context of a track-type tractor, where a first ground-engaging track 16 is shown upon a first side of frame 12, and a substantially identical second ground-engaging track is positioned upon an opposite side of frame 12, not visible in FIG. 1. Ground-engaging track system 14 (hereinafter "track system 14") includes a front idler 30, a back idler 32, a drive sprocket 34, and a track roller frame 36. Machine 10 is shown with track system 14 in a so-called high drive configuration, however, it should be appreciated that other track configurations could be used such as an oval track configuration, a half track configuration, or still another. Machine 10 could be equipped with a dozing blade, or a bucket as a track-type loader, or could be an excavator, a front shovel, or any of a variety of other off-highway machines. A plurality of track rollers 38 are mounted to track roller frame 36, and support track roller frame 36 upon ground-engaging track 16. As will be further apparent from the following description, track rollers 38 are contemplated to provide reduced field failure rates, and improved manufacturing considerations relating to tolerance, and reduced end play ultimately affecting seal life.

Figure 2:
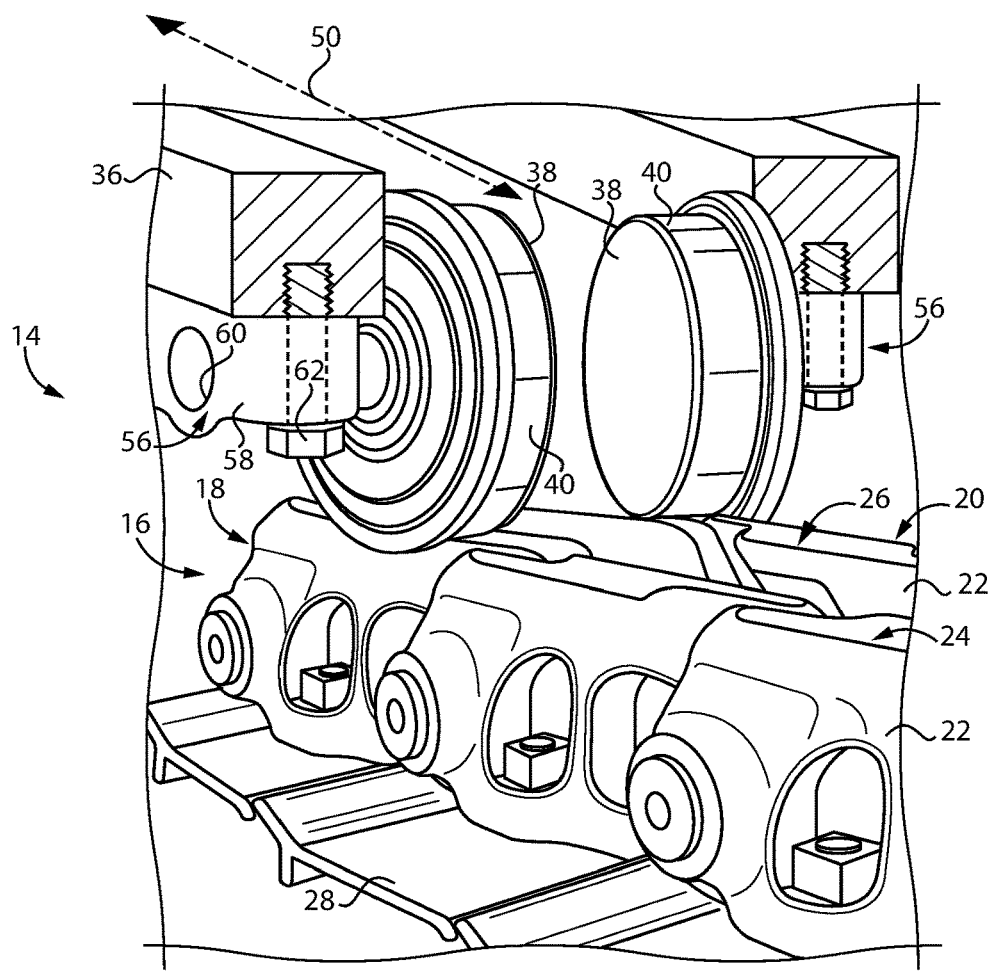
FIG. 2 is a diagrammatic view, in perspective, of a ground-engaging track system, according to one embodiment.

Referring also now to FIG. 2, ground-engaging track 16 (hereinafter "track 16") includes a first track chain 18 and a second track chain 20 each having track links 22 coupled together in an end-to-end arrangement to form, respectively, a first track rail 24 and a second track rail 26. Track 16 also includes track shoes 28 coupling together first track chain 18 and second track chain 20. Track shoes 28 can be bolted to track links 22, as shown, but could be formed integrally with track links 22 in some embodiments. Track links 22 could include offset links with laterally offset link straps, straight links, or any other suitable link configuration.

Figure 3:
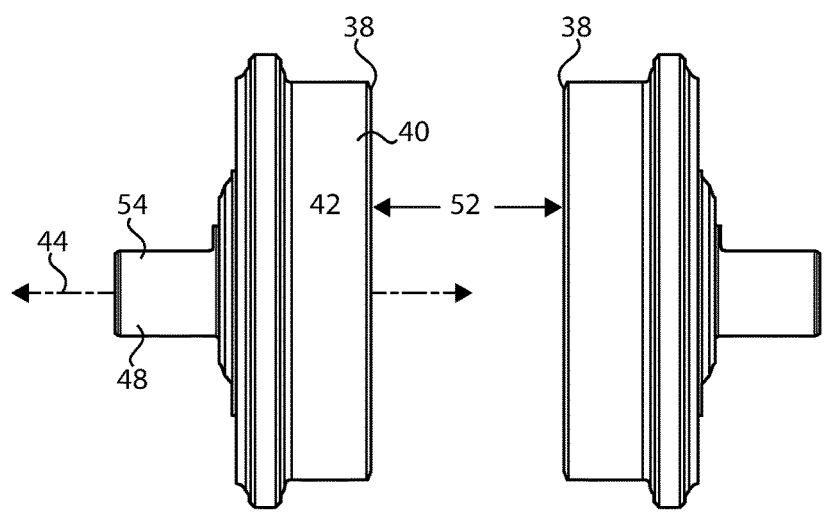
FIG. 3 is a side diagrammatic view of track rollers arranged for service in a ground-engaging track system, according to one embodiment.

Referring also now to FIG. 3, each of track rollers 38 includes a roller shell 40 having an outer tread surface 42 extending circumferentially around a track roller axis 44, a shaft bore (not shown in FIGS. 1-3), and a roller shaft 48 within the respective shaft bore. Each roller shaft 48 includes a mounting end 54 coupled to track roller frame 36 and a journaling end (not shown in FIGS. 1-3) supporting the respective roller shell 40 for rotation. Each of track rollers 38 is cantilevered by the respective roller shaft 48 to track roller frame 36 and positioned, in contact with only one of first track rail 24 or second track rail 26, to support track roller frame 36 upon track 16.

Those skilled in the art will appreciate that ground-engaging track systems conventionally employ track rollers that contact each of two track rails simultaneously during service to support the weight of the associated machine by way of a track roller frame. According to the present disclosure, track rollers 38, and other track rollers contemplated herein, contact only one track rail, and thus together support a weight of track roller frame 36 and machine 10 by way of contact with the respective one track rail. In some embodiments, as illustrated in FIG. 2 and FIG. 3, track rollers 38 may be arranged in opposite pairs and positioned substantially coaxially with one another. In other embodiments, track rollers contacting one track rail may be offset in a fore-to-aft direction relative to track rollers contacting a second, parallel track rail, as further discussed herein. Also in the illustrated embodiment, each roller shaft 38 extends, from the respective mounting end 54 toward the journaling end, obscured within roller shell 40 in the drawings, toward a longitudinal centerline 50 of track roller frame 36. It will thus be appreciated that each roller shaft 48 extends in an inboard direction as shown, and a clearance 52 extends between track rollers in contact with only first track rail 24 and track rollers in contact with only second track rail 26. It will be recalled that track rollers 38 are positioned generally in coaxial pairs, thus clearance 52 extends more or less in an inboard-outboard direction between the pairs of track rollers 38. In other embodiments, a clearance may still be understood to extend between track rollers in contact with only one track rail versus track rollers in contact with only another track rail, even where the track rollers are offset in a fore-to-aft direction as described.

Track system 14 may further include a plurality of clamping mounts 56 coupling mounting ends 54 of roller shafts 48 to track roller frame 36. In the illustrated embodiment, each clamping mount 56 includes a clamping piece 58 having a bore 60 formed therein that receives a respective roller shaft 48, and a fastener 56 that extends through clamping piece 58 and is received in track roller frame 36. It can also be noted that clamping mounts 56 are undermounted relative to track roller frame 36. In other embodiments, one or more clamping mounts could be provided including multiple clamping blocks that are separate from, or integrated with, track roller frame 36 and could be undermounted as shown, received within a window formed in track roller frame 36, or in any other suitable arrangement.

Figure 4:
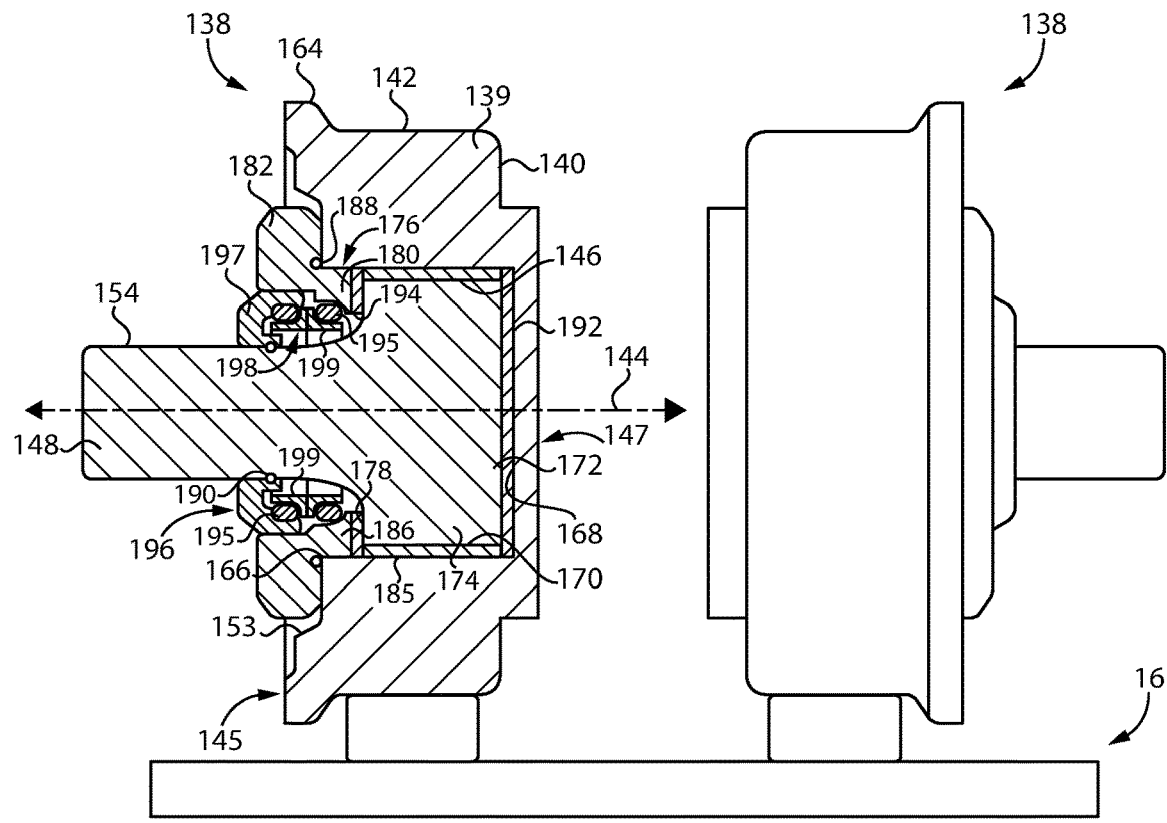
FIG. 4 is a partially sectioned side diagrammatic view of track rollers positioned for service in a ground-engaging track system, according to one embodiment.

Turning now to FIG. 4, there are shown track rollers 138 according to another embodiment, having similarities with track rollers 38 of FIGS. 1-3 but also certain differences. In FIG. 4 track rollers 138 are shown as they might appear positioned for service upon a ground-engaging track 16 similar to the ground-engaging track discussed above. It should also be noted that discussion or description herein of any one embodiment should be understood by way of analogy to refer to any other embodiment, except where otherwise indicated or apparent from the context. Each of track rollers 138, and hereinafter referred to in the singular, includes a roller shell 140 having a metallic roller shell body 139 that is formed by casting, forging, or any other suitable manufacturing technique for metallic materials such as iron or steel. Roller shell 140, and roller shell 139, includes an outer tread surface 142 extending circumferentially around a roller axis 144, and axially between a roller shell first axial end face 145 and a roller shell second axial end face 147. As discussed further herein, an axial length of outer tread surface 142 is equal to at least a majority of a full axial length of roller shell 140. A guide flange 164 is located adjacent to outer tread surface 142, and interposed roller shell first axial end face 145 and outer tread surface 142. Roller shell 140, and roller shell body 139, the description of which will be understood hereinafter to be included in description of roller shell 140, also includes a shaft bore 146 extending between an open bore end 166 and a blind bore end 168. Blind bore end 168 could be formed by integral material of roller shell body 139, or could be formed by an attached separate plate or the like. Roller shell first axial end face 145 has a recess 153 formed therein, and located radially inward of guide flange 164. Open bore end 166 is located in recess 153. Roller shell 140 also includes a first radiused transition 149 between guide flange 164 and outer tread surface 142, and a second radiused transition between outer tread surface 142 and roller shell second axial end face 147.

Roller shell 140 further includes a bearing surface 170 located in shaft bore 146 adjacent to blind bore end 168 and extending circumferentially around roller axis 144. In one implementation, bearing surface 170 is formed on a sleeve bearing 185 fitted within shaft bore 146, for example by way of an interference fit, and formed of a steel material. Track roller 138 further includes a roller shaft 148 supporting roller shell 140 for rotation and including a journaling end 172 having a shaft head 174, that is enlarged relative to mounting end 154. Shaft head 174 is positioned within shaft bore 146 in contact with bearing surface 170. In one implementation, shaft head 154 can be bronze coated to advantageously interact with a steel material of sleeve bearing 185. Roller shaft 148 further includes a mounting end 154 projecting from open bore end 166 for cantilevering track roller 138 to a track roller frame, such as track roller frame 36 in the embodiment of FIGS. 1-3. Each of journaling end 172, including shaft head 174, and mounting end 154, can be substantially cylindrical.

In the embodiment of FIG. 4, it will be understood that track roller 138 shown on the left-hand side of the drawing, is in contact with only a first track rail, and track roller 138 shown on the right-hand side of the drawing is in contact with only a second track rail. It will further be noted that the left track roller 138 is shown sectioned, whereas the right track roller 138 is not sectioned. The track rollers 138 in FIG. 4 may be understood to be staggered relative to one another, hence, a section plane of the left track roller 138 would pass in front of or behind the right track roller 138. It is believed that in some applications, where locations of track rollers in contact with only a first track rail are staggered relative to locations of track rollers in contact with only a second track rail, in a track system, ride quality may be superior to conventional track systems with track rollers contacting both track chains.

Figures 5, 6:
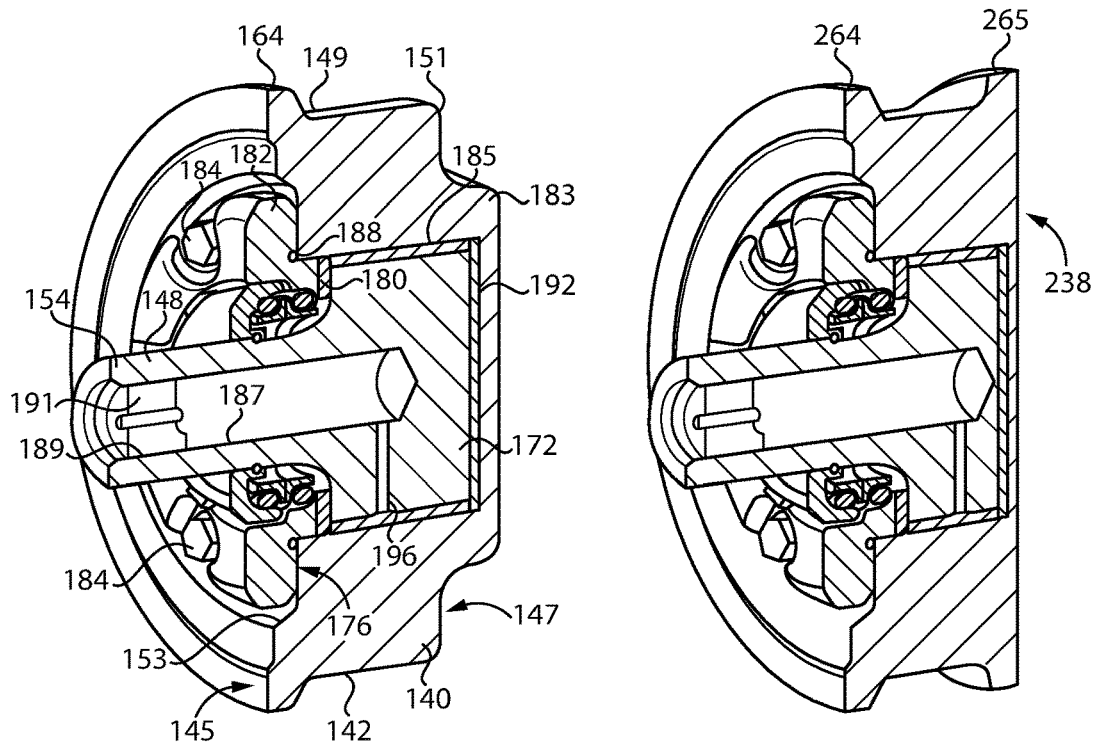
FIG. 5 is a sectioned view, in perspective, of a track roller, according to one embodiment.
FIG. 6 is a sectioned view, in perspective, of a track roller, according to one embodiment.

Track roller 138 further includes a rotation joint assembly 176 connecting roller shell 140 to roller shaft 148. Rotation joint assembly 176 includes a first surface 178, fixed relative to roller shaft 148 and facing a direction of mounting end 154, and a second surface 180, fixed to rotate with roller shell 140 and oriented in opposition to first surface 178, such that roller shaft 148 is trapped within shaft bore 146. Referring also now to FIG. 5, in the illustrated embodiment first surface 178 includes a shoulder surface of shaft head 174. Rotation joint assembly 176 may also include a clamping ring 182 positioned about roller shaft 148, and a plurality of bolts 184 attaching clamping ring 182 to roller shell 140. Clamping ring 182 may also include a projection 186, which may be generally cylindrical, extending from clamping ring 182 into shaft bore 146 and having second surface 180 of rotation joint assembly 176 formed thereon. It can also be seen from FIGS. 4 and 5 that track roller 138 further includes a first thrust washer 192 trapped between shaft head 174 and roller shell 140, and a second thrust washer 194 trapped between first surface 178 and second surface 180. An O-ring seal 188 may be sandwiched between clamping ring 182 and roller shell 140, with clamping ring 182 positioned at least partially within recess 153.

Track roller 138 may further include a seal assembly, for example a face seal assembly 196, held in compression upon roller shaft 48. Track system 14, and other track systems contemplated herein, may thus include a plurality of face seal assemblies each held in compression upon the respective one of a plurality of roller shafts of a plurality of track rollers. Seal assembly 196 may include a seal carrier 197 fitted upon roller shaft 148. Another O-ring seal 190 may be positioned between seal carrier 197 and roller shaft 148. In one implementation, seal carrier 197 may be interference-fitted upon roller shaft 148 such that seal assembly 196 is squeezed between seal carrier 197 and roller shell 140. Seal assemblies could be held in compression by way of contact with a track roller frame, a clamping mount, a roller shell by way of other suitable techniques. Seal assembly 196 may further include a face seal 198 held in compression between seal carrier 197 and projection 186. Face seal 198 may include a metal face seal, with two seal rings 199 having contacted sealing faces that rotate relative to one another, and two sealing elements such as non-metallic torics 195.

It can further be noted from FIG. 4 and FIG. 5 that journaling end 172 terminates within shaft bore 146. Mounting end 154 and journaling end 172, including shaft head 174, together may form a T-shape, in a longitudinal cross section. FIG. 5 further illustrates a protrusion 183 formed by or upon roller shell second axial end face 147. Protrusion 183 might or might not be an integral part of roller shell 138, and could include a welded on plate or the like. In still other instances, journaling end 172 might not terminate within shaft bore 146, but could extend somewhat past shaft bore 146 or even be exposed at roller shell second axial end face 147. FIG. 5 also illustrates various lubrication features of track roller 140. An oil bore 187 may be formed in roller shaft 148 and extends between a plugged port 189 formed in mounting end 154 of roller shaft 148, and an open port 193 formed in journaling end 172 and positioned to feed lubricating oil to bearing surface 170 and bearing 185. Thrust washer 192, and other internal components and surfaces of track roller 140 could also receive oil distributed by way of open port 193. A plug 191 is shown received in plugged port 189.

Referring now to FIG. 6, there is shown a track roller 238 according to another embodiment. Track roller 238 may be similar to track roller 138 in certain respects, but has certain differences. In track roller 238 two guide flanges are provided, including a first guide flange 264 and a second guide flange 265. Those skilled in the art will appreciate how guide flanges 264 and 265 can enable track roller 238 to fit over a track rail that track roller 238 rides upon. It will also be recalled that certain track roller embodiments contemplated herein do not have an inboard protrusion analogous to protrusion 183. Track roller 238 is formed without such a protrusion, and the respective axial end face would be understood to be substantially uniform across a radial extent and a circumferential extent thereof.

Figure 7:
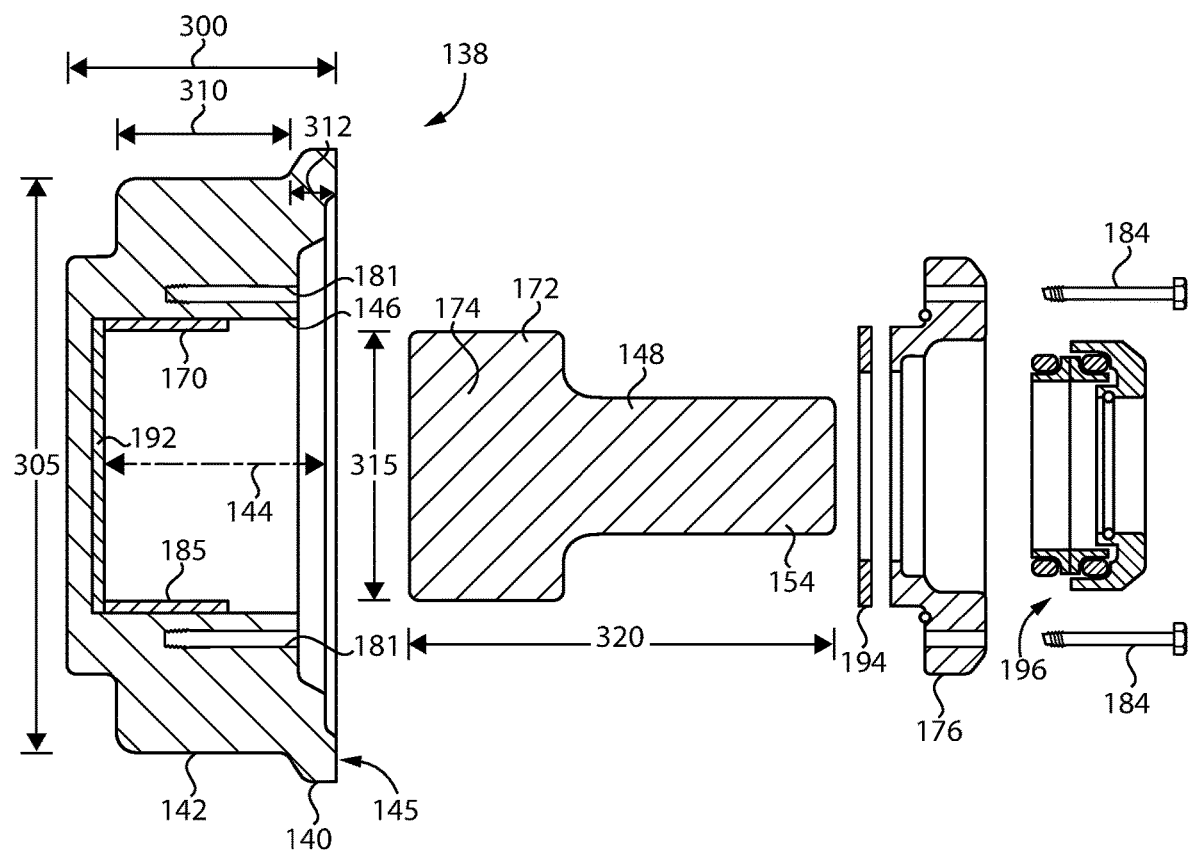
FIG. 7 is an exploded view of a track roller, according to one embodiment.

Referring to the drawings generally, but in particular now to FIG. 7, there is shown an exploded view of track roller 138, and illustrating and identifying certain additional dimensional and proportional attributes. Roller shell 140 defines an axial length dimension 300, parallel to roller axis 144. Outer tread surface 142 defines a radial diameter dimension 305, normal to roller access 144. Radial diameter dimension 305 is larger than axial length dimension 310. Outer tread surface 142 defines a second axial length dimension 310. Radial diameter dimension 305 is also larger than second axial length dimension 310. In one embodiment, a ratio of second axial length dimension 310 to radial diameter dimension 305 is from 0.2:1 to 0.4:1. In a refinement, a ratio of second axial length dimension 310 to radial diameter dimension 305 is from 0.25:1 to 0.35:1. In a further refinement, the ratio of second axial length dimension 310 to radial diameter dimension 305 is 0.3:1, and more particularly still 0.30:1. One example of suitable sizes of second axial length dimension 310 and radial diameter dimension 305 is approximately 74 millimeters and approximately 247 millimeters, respectively. A flange axial width dimension 312 may be about 20 millimeters, for example.

Also depicted in FIG. 7 is a length dimension 320 of roller shaft 148 and a width dimension 315 of shaft head 174. Shaft head width dimension 315 may be less than shaft length dimension 320, and in one implementation a ratio of shaft head width dimension to shaft length is from 0.5:1 to 0.6:1, and in a refinement 0.57:1. Shaft length dimension 320 might be approximately 200 millimeters, and shaft head width dimension 315 might be approximately 114 millimeters, although the present disclosure is not thereby limited. Also shown in FIG. 7 are bolt holes 181 formed in roller shell 140 and extending axially inward from roller shell first axial end face 145. Bolt holes 181 are distributed circumferentially around roller axis 144 and are overlapping in axial extent with bearing surface 170.

INDUSTRIAL APPLICABILITY

During service in a track system, track roller 138, and by analogy any of the other track roller embodiments contemplated herein, rotates about roller axis 144, and is rotatably journaled by way of journaling end 172 of roller shaft 148. Various side loads, bending loads, and others may be experienced by track roller 138 and roller shaft 148 during service. The relatively enlarged size of shaft head 174, relative to mounting end 154, can provide material thickness and surface area for accommodating the various loads and maintaining robust rotational support for roller shell 140.

In contrast to certain known track roller configurations, as discussed herein track roller 138 is transmitting loads during service only between a track roller frame and one track rail. Dedicating the function of a track roller to riding upon only a single track rail provides certain advantages from the standpoint of manufacturing, and also during service. Material costs can be reduced in comparison to track rollers that span the space between track rails. Stack-up tolerances may also be reduced, as compared to rollers structured for contacting two track rails simultaneously. End play, where components move relative to one another, may also be reduced, reducing dynamic changes to the state of compression of seal assemblies and thereby prolonging seal life in many instances. Further still, dedicating a track roller to contact with only a single track rail is contemplated to allow axial shift relative to track rollers contacting the other track rail. In other words, as loads are experienced and components of the track system shift side-to-side, for example, track rollers according to the present disclosure can shift independently of track rollers contacting an adjacent, parallel, track rail, providing continuous support for track links of the ground-engaging track in each track chain instead of biasing support at any given time to one track chain or the other.

The present description is for illustrative purposes only, and should not be construed to narrow the breadth of the present disclosure in any way, Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A ground-engaging track system comprising:
   a ground-engaging track including a first track chain and a second track chain each having track links coupled together in an end-to-end arrangement to form, respectively, a first track rail and a second track rail, and track shoes coupling together the first track chain and the second track chain;
   a plurality of track rollers each including a roller shell having an outer tread surface extending circumferentially around a track roller axis, a shaft bore, and a roller shaft within the shaft bore;
   a track roller frame, wherein
      each of the roller shafts including a mounting end coupled to the track roller frame, and a journaling end supporting the respective roller shell for rotation, and
      each of the track rollers is cantilevered by the respective roller shaft to the track roller frame and positioned, in contact with only one of the first track rail or the second track rail, to support the track roller frame upon the ground-engaging track; and
   a plurality of rotation joint assemblies, each rotation joint assembly connecting a respective roller shell to a respective roller shaft, and including:
      a first surface fixed to the respective roller shaft,
      a second surface configured to rotate with the respective roller shell,
      a first thrust washer trapped between the shaft head of the respective roller shaft and the respective roller shell, and
      a second thrust washer trapped between the first surface and the second surface.

2. The track system of claim 1 wherein:
   each of the roller shafts extends, from the mounting end toward the journaling end, in an inboard direction toward a longitudinal centerline of the track roller frame; and
   a clearance extends between track rollers in contact with only the first track rail and track rollers in contact with only the second track rail.

3. The track system of claim 2 wherein locations of the track rollers in contact with only the first track rail are staggered relative to locations of the track rollers in contact with only the second track rail.

4. The track system of claim 2 further comprising:
   a plurality of clamping mounts coupling the mounting ends of the roller shafts to the track roller frame; and
   a plurality of face seal assemblies each held in compression upon the respective one of the roller shafts.

5. The track system of claim 1 wherein the journaling end of each of the roller shafts terminates within the respective axially extending shaft bore.

6. The track system of claim 5 wherein the journaling end of each of the roller shafts includes a shaft head that is enlarged relative to the respective mounting end.

7. The track system of claim 6 wherein the journaling end and the mounting end together form a T-shape, in a longitudinal cross section.

8. A track roller for a ground-engaging track system comprising:
   a roller shell including an outer tread surface extending circumferentially around a roller axis, and axially between a roller shell first axial end face and a roller shell second axial end face, and having a tread surface axial length equal to at least a majority of a full axial length of the roller shell;
   the roller shell further including a guide flange located adjacent to the outer tread surface, a shaft bore extending between an open bore end and a blind bore end, and a bearing surface located in the shaft bore adjacent to the blind bore end and extending circumferentially around the roller axis;
   a roller shaft supporting the roller shell for rotation and including a journaling end having a shaft head positioned within the shaft bore in contact with the bearing surface, and a mounting end projecting from the open bore end for cantilevering the track roller to a track roller frame; and a rotation joint assembly connecting the roller shell to the roller shaft and including:
a first surface, fixed relative to the roller shaft and facing a direction of the mounting end,
a second surface, fixed to rotate with the roller shell and oriented in opposition to the first surface, such that the roller shaft is trapped within the shaft bore,
a first thrust washer trapped between the shaft head and the roller shell, and
a second thrust washer trapped between the first surface and the second surface.

9. The track roller of claim 8 wherein the first surface of the rotation joint assembly includes a shoulder surface of the shaft head.

10. The track roller of claim 9 wherein the rotation joint assembly includes a clamping ring positioned about the roller shaft, a plurality of bolts attaching the clamping ring to the roller shell, and a projection extending from the clamping ring into the shaft bore and having the second surface of the rotation joint assembly formed thereon.

11. The track roller of claim 10 further comprising a face seal assembly including a seal housing fitted upon the roller shaft, and a face seal held in compression between the seal housing and the projection.

12. The track roller of claim 9 wherein the journaling end terminates within the shaft bore, and the mounting end and the journaling end together form a T-shape.

13. The track roller of claim 12 wherein an oil bore is formed in the roller shaft and extends between a plugged port formed in the mounting end of the roller shaft, and an open port formed in the journaling end and positioned to feed lubricating oil to the bearing surface.

14. The track roller of claim 9 wherein the roller shell defines an axial length dimension, parallel to the roller axis, and the outer tread surface defines a radial diameter dimension, normal to the roller axis, and the radial diameter dimension is larger than the axial length dimension.

15. The track roller of claim 14 wherein the outer tread surface defines a second axial length dimension, and a ratio of the second axial length dimension to the radial diameter dimension is from 0.2:1 to 0.4:1.

16. A roller shell for a track roller in a ground-engaging track system, the roller shell comprising:
a roller shell body including an outer tread surface extending circumferentially around a roller axis, and axially between a roller shell first axial end face and a roller shell second axial end face;
a guide flange interposed between the roller shell first axial end face and the outer tread surface, and extending circumferentially around the roller axis;
the first axial end face having a recess formed therein, and located radially inward of the guide flange, and a shaft bore formed in the roller shell body and extending between an open bore end located in the recess, and a blind bore end;
a bearing surface located in the shaft bore adjacent to the blind bore end, and extending circumferentially around the roller axis to contact a journaling end of a roller shaft within the shaft bore, the journaling end having a shaft head positioned within the shaft bore in contact with the bearing surface, the roller shaft further including a mounting end projecting from the open bore end; and
a rotation joint assembly connecting the roller shell to the roller shaft, the rotation joint assembly including:
a first surface fixed relative to the roller shaft,
a second surface configured to rotate with the roller shell,
a first thrush washer trapped between the shaft head and the roller shell, and
a second thrust washer trapped between the first surface and the second surface, wherein:
the roller shell defines an axial length dimension, parallel to the roller axis, and the outer tread surface defines a radial diameter dimension, normal to the roller axis, and the radial diameter dimension is larger than the axial length dimension.

17. The roller shell of claim 16 wherein the outer tread surface defines a second axial length dimension, and a ratio of the second axial length dimension to the radial diameter dimension is from 0.2:1 to 0.4:1.

18. The roller shell of claim 17 wherein the ratio of the second axial length dimension to the radial diameter dimension is 0.3:1.

19. The roller shell of claim 16 further comprising a bearing insert within the shaft bore and having the bearing surface formed thereon, and bolt holes extending axially inward from the first axial end face, and the bolt holes are distributed circumferentially around the roller axis and are overlapping in axial extent with the bearing surface.

* * * * *